UNITED STATES PATENT OFFICE.

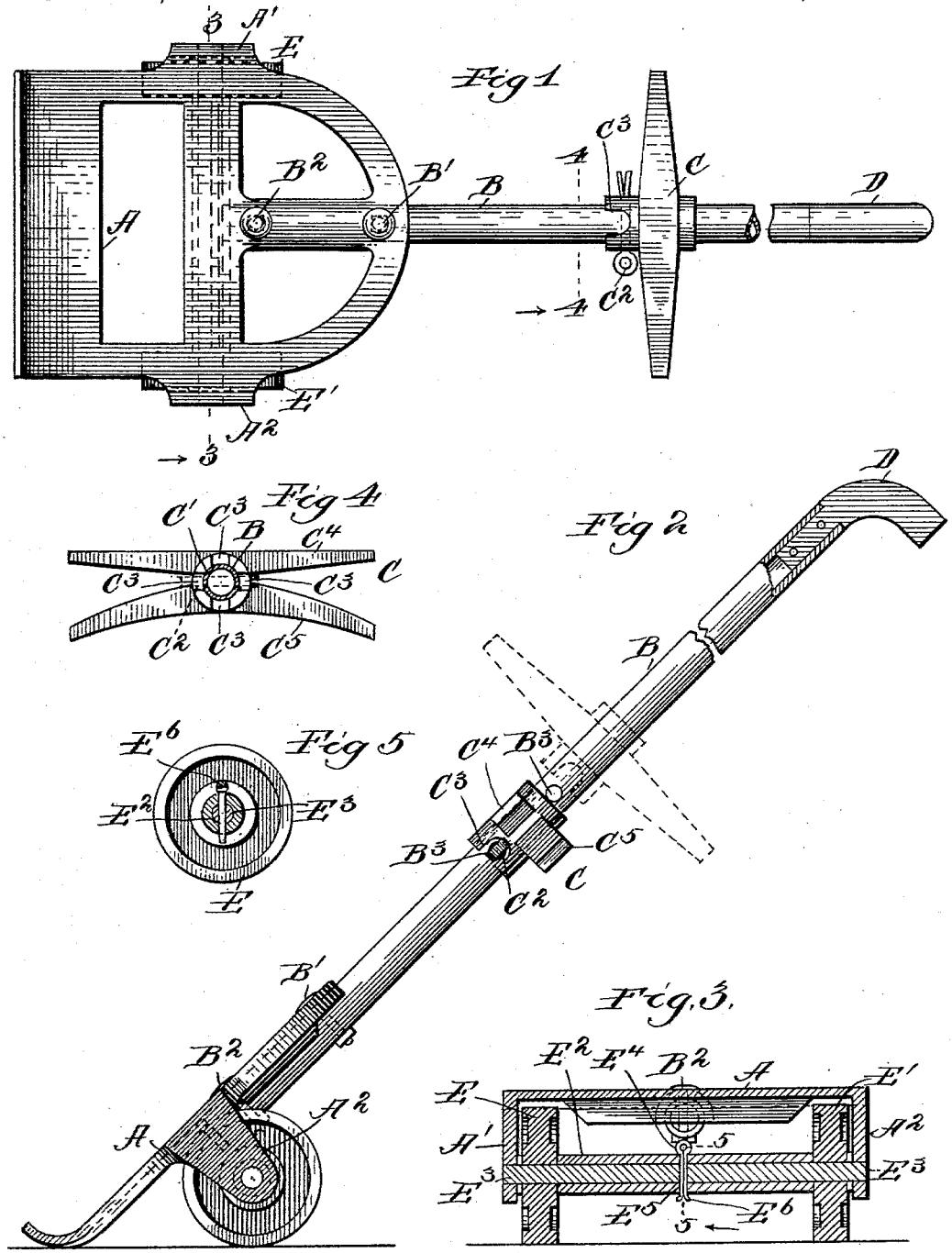

JAMES MACPHAIL, OF BLUE ISLAND, ILLINOIS.

TRUCK.

SPECIFICATION forming part of Letters Patent No. 593,226, dated November 9, 1897.

Application filed August 7, 1896. Serial No. 602,106. (No model.)

*To all whom it may concern:*

Be it known that I, JAMES MACPHAIL, a citizen of the United States, residing at Blue Island, in the county of Cook and State of Illinois, have invented certain new and useful Improvements in Trucks, of which the following is a specification.

My invention relates to trucks for handling boxes, barrels, merchandise in packages, &c.; and it consists of certain new and useful features of construction and combinations of parts hereinafter fully described, and specifically pointed out in the claims.

Referring to the accompanying drawings, which form a part of this specification, Figure 1 is a top plan view of truck embodying my invention. Fig. 2 is a side elevation of the same in working position. Fig. 3 is a cross-section on the dotted line 3 3 of Fig. 1. Fig. 4 is a section on the dotted line 4 4 of Fig. 1. Fig. 5 is a section on the dotted line 5 5 of Fig. 3.

Like letters of reference indicate corresponding parts throughout the several views.

A is a truck-frame provided with downwardly-projecting axle-lugs $A'$ $A^2$.

B is a truck-handle formed of gas-pipe and secured to the truck-frame A by means of bolts $B'$ $B^2$.

C is a truck-frame extension having a transverse circular opening $C'$ therethrough to admit the truck-frame handle B, whereon it may be slid and whereto it may be secured by means of a cotter $C^2$, passed through a hole $B^3$ therein and fitting into slots $C^3$ in said truck-frame extension C. One side $C^4$ of the truck-frame extension C is straight and the opposite side is curved to adapt the truck to carry packages having flat or curved surfaces, as boxes or casks. Obviously the truck-frame A may in effect be extended to any desired length, limited only by the length of the handle B, by sliding the part C thereon; also, either of the sides $C^4$ $C^5$ of the extension C may be turned uppermost, as desired.

D is a handle inserted into and fastened to the truck-handle B.

E $E'$ are wheels separated by the sleeve $E^2$.

$E^3$ is a rotatable axle passed through the wheels E $E'$, sleeve $E^2$, and axle-lugs $A'$ $A^2$.

$E^4$ is a cotter passed through the openings $E^5$ $E^6$ in the sleeve $E^2$ and axle $E^3$ to prevent the sleeve from moving on the axle.

The truck herein shown and described is of very simple construction, can be manufactured at comparatively small cost, and can be adapted, by reason of its extension device C, to a great variety of uses.

I claim—

1. In a truck, in combination, a truck-frame, a truck-handle secured thereto, and a reversible truck-frame extension adapted to be slid along, and secured to, the truck-handle, substantially as and for the purpose specified.

2. In a truck, in combination, a truck-frame, supporting-wheels therefor, a truck-handle for the frame, a truck-frame extension capable of being slid along the truck-handle, and means for fixing the frame extension with relation to the truck-handle, substantially as and for the purpose specified.

3. In a truck, in combination, a truck-frame, a handle secured thereto, a reversible truck-frame extension, capable of being slid lengthwise of the truck-handle, which extension has a curving face and a flat face, and means for fixing the extension with relation to the truck-handle, substantially as and for the purpose specified.

4. In a truck, in combination, a truck-frame, provided with downwardly-projecting axle-lugs, an axle fixed in the axle-lugs, wheels mounted loosely on the axle, a sleeve for separating the wheels rigidly secured to the axle, a truck-handle secured to the truck-frame, a truck-frame extension capable of turning upon the handle and of being slid lengthwise thereof, which extension has a curving face and a flat face, and means for fixing the extension with relation to the truck-handle, substantially as and for the purpose specified.

JAMES MACPHAIL.

Witnesses:
L. L. MORRISON,
NELLIE BUNKER.